Nov. 19, 1929.        A. G. DEMAND        1,736,189
SAFETY SWITCH FOR VEHICLE DOORS
Filed May 31, 1927        2 Sheets-Sheet 1
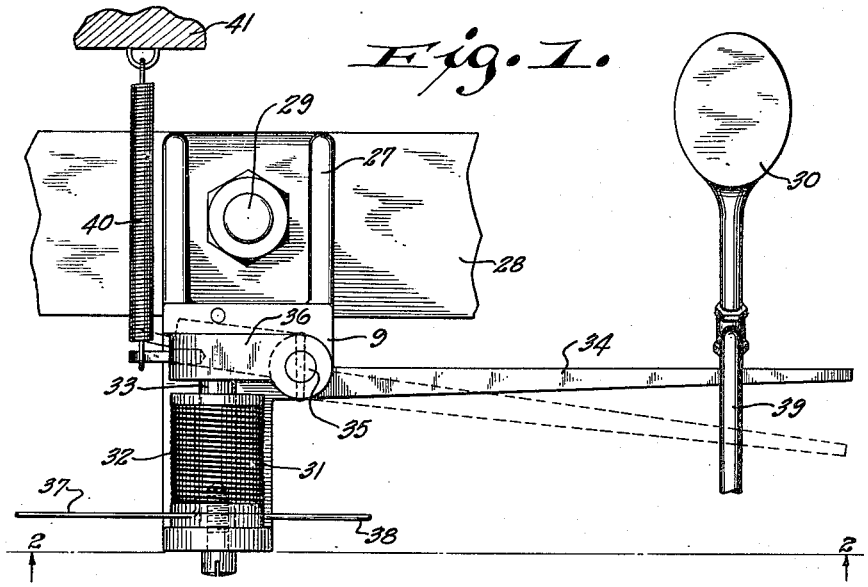
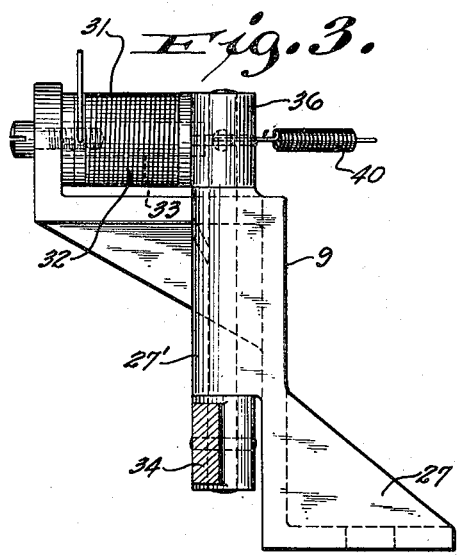
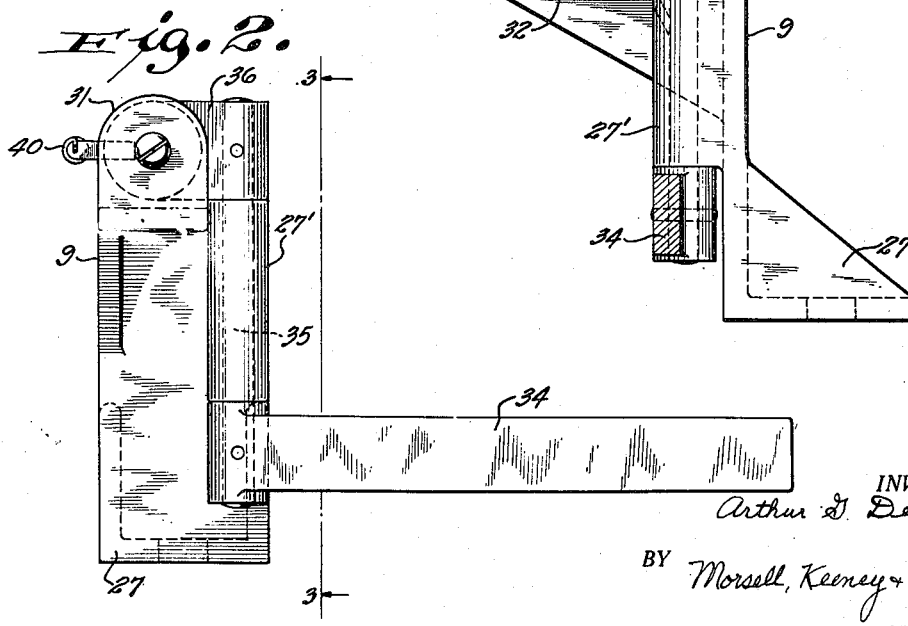
INVENTOR.
Arthur G. Demand,
BY Morsell, Keeney & Morsell
ATTORNEYS Nov. 19, 1929.  A. G. DEMAND  1,736,189
SAFETY SWITCH FOR VEHICLE DOORS
Filed May 31, 1927   2 Sheets-Sheet 2
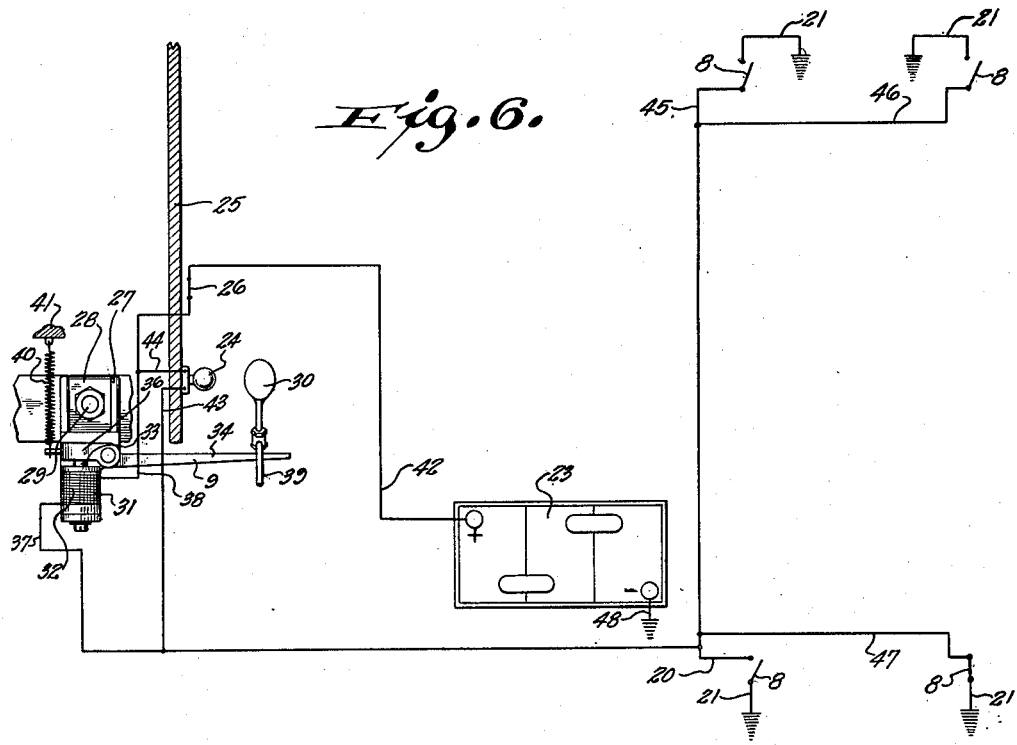
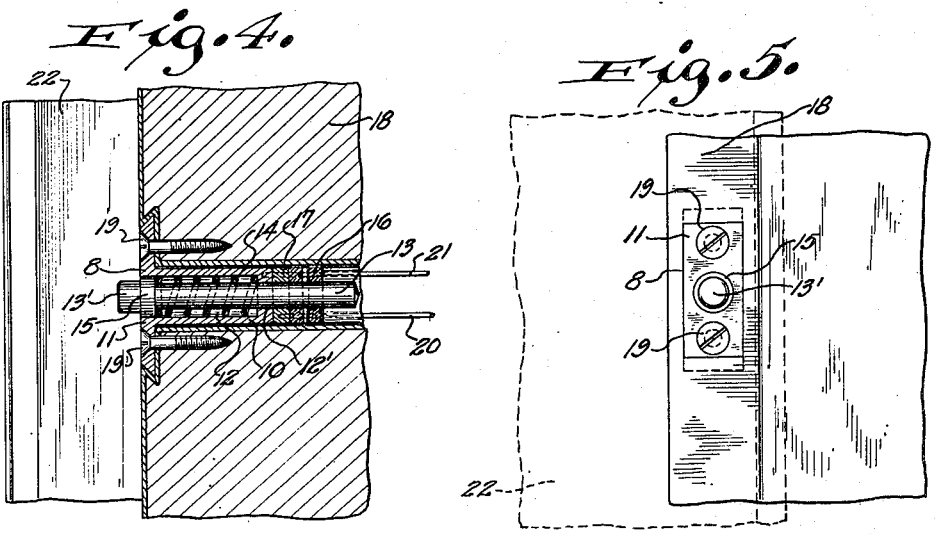
INVENTOR.
Arthur G. Demand,
BY Morsell, Keeney & Morsell
ATTORNEYS Patented Nov. 19, 1929

1,736,189

UNITED STATES PATENT OFFICE

ARTHUR G. DEMAND, OF APPLETON, WISCONSIN

SAFETY SWITCH FOR VEHICLE DOORS

Application filed May 31, 1927. Serial No. 195,436.

This invention relates to improvements in safety switches for vehicle doors.

It is the primary object of the present invention to provide a device which will automatically operate to prevent the movement of a vehicle from a standing position if any of the doors of the vehicle are open or are improperly latched.

A further object of the invention is to provide a switch controlled device for motor vehicles, which, if all of the vehicle doors are properly closed, will permit the normal operation of the vehicle, but if any door is open or unlatched, the device will prevent the engagement of the clutch to obtain power to move the vehicle from standing position, and a signal will also be operated on the vehicle dash to notify the driver that all of the doors are not properly closed.

A further object of the invention is to provide a device of the character described with which any motor vehicle may be readily equipped, the device being automatically operated by current from the storage battery of the vehicle.

A further object of the invention is to provide a safety switch for vehicle doors which is of very simple construction, is strong and durable, is inexpensive to manufacture and install, is efficient and effective in operation, and is well adapted for the purposes described.

With the above and other objects in view, the invention consists of the improved vehicle door safety switch, and its parts and combinations as set forth in the claims, and all equivalents thereof.

In the accompanying drawings, in which the same reference characters indicate the same parts in all of the views:

Fig. 1 is a side view of a magnetic clutch pedal stop forming part of the device and connected with a portion of a vehicle frame;

Fig. 2 is an inverted plan view of the clutch pedal stop indicated on line 2—2 of Fig. 1;

Fig. 3 is a view taken on line 3—3 of Fig. 2;

Fig. 4 is a vertical sectional view through a vehicle door frame showing a door switch mounted therein, the latter being in section;

Fig. 5 is a front view of a switch as mounted in a door frame; and

Fig. 6 is a diagrammatic view of the arrangement of the device on a vehicle with four doors, and showing the wiring connections.

Referring now more particularly to the drawings, it will appear that the device includes a switch 8 for each vehicle door (see Figs. 4 and 5), and a magnetic clutch pedal stop 9 mounted on the vehicle frame in proximity to the clutch pedal (see Fig. 1) and in electrical connection with all of the switches.

One of the switches 8 will now be described, and it will be seen to comprise a metallic cylindrical barrel member 10 having a head portion 11 and a longitudinal bore 12 reduced at the inner end portion, as at 12'. A plunger 13 is movably mounted in the bore of the barrel member and projects therefrom at both ends. The front end portion of the plunger is formed as a button 13' and a coiled spring 14 is confined within the bore 12 between the inner end portion of the barrel and an enlargement 15 on the front end portion of the plunger. A fiber collar 16 is pinned to the inner end portion of the plunger exteriorly of the barrel, and between said collar and end of the barrel a brass washer 17 is mounted fast on the plunger.

Each of the switches 8 is mounted in the door frame 18 of an automobile and is held thereto by screws 19 extended through the head portion 11 of the switch, and a circuit wire 20 is connected with the brass washer 17. A second circuit wire 21 which is grounded to the frame of the automobile, extends to the metallic barrel 10 of the switch. The switch 8 is mounted with relation to a vehicle door 22 (shown partially open) in a manner so that when the door is closed, it will engage the button portion 13' of the plunger and push the plunger inwardly against the tension of the spring 14. This movement will separate the brass washer 17 from engagement with the metallic barrel portion and will open the circuit in which said switch is included. It should also be observed that the clutch pedal stop 9, a storage battery 23 of the vehicle, the vehicle ignition switch 26 and an incandescent signal bulb 24 on the vehicle instrument board 25 are included in the same circuit, as will later be explained more in detail. Obviously, when the door 22 is opened, the spring 14 will return the plunger to normal position and bring the brass washer 17 into contact with the barrel whereby the circuit will be closed.

The clutch pedal stop 9 is provided with a bracket portion 27 to engage a frame portion 28 of the vehicle to which it is secured by a bolt 29 and in juxtaposition to the vehicle clutch pedal 30, and depending from the bracket portion is a magnet 31 in the form of a spool upon which a coil 32 is wound and through which an armature 33 is extended. A stop arm 34 is pinned at its inner end portion to one end portion of a pivot bolt 35 extended through a bearing portion 27' of the bracket and pinned to the opposite end portion of the pivot bolt is a short arm 36 extended in a direction opposite to that of the stop arm 34 and adjacent the armature of the magnet. When the magnet is energized by circuit wires 37 and 38, which also include the vehicle battery 23, the short arm 36 is attracted by the armature and moved to the full line position shown in Fig. 1, causing an upward movement of the free end portion of the stop arm 34 to engage under a portion of the clutch pedal shank 39, thereby preventing the depression of the clutch pedal 30 and the engagement of the vehicle clutch. However, when the magnet is not energized, the stop arm 34 and short arm 36 will assume the position shown in dotted lines in Fig. 1, being returned thereto by a coiled spring 40 connected to a portion of the vehicle frame 41 and to the arm 36, and the stop arm will not then interfere with the free operation of the clutch pedal.

In Fig. 6 is shown a diagrammatic view of the device as arranged for an automobile having four doors. A circuit wire 42 is connected with one of the terminals of the storage battery 23 and said wire extends to the ignition switch 26 of the vehicle. Extending from the other terminal of the switch is the wire 38 which connects with one end of the coil 32 of the magnet and the wire 37 is connected with the other end portion of the coil. Shunt wires 43 and 44 extend from the wires 37 and 38 to the signal bulb 24 on the instrument board 25. The wire 37 from the coil extends to all of the switches 8 and is connected thereto by connections 20, 45, 46 and 47. Each switch is independently grounded to the frame of the vehicle by wires 21, as is the other terminal of the battery by a ground connection 48.

As previously explained, each switch is operated by a door and the circuit is open when the door is closed, and closed when the door is open, if the ignition switch is turned on. As shown in Fig. 6, all of the switches except one are open, and the ignition switch is closed with a result that a circuit is completed through the battery, the magnet, the signal bulb and the closed switch, resulting in an energizing of the magnet whereby the stop arms 34 is held in the position shown to prevent depression of the clutch pedal, and of course, the clutch cannot then be engaged and the car cannot be driven from standing position. The signal bulb 24 will also be illuminated to notify the driver, and as soon as the vehicle door is closed, the circuit will be broken and the stop arm will move to inoperative position to permit the normal operation of the vehicle. Obviously, the switch and stop system may be connected with any number of vehicle doors.

It will thus be seen that with the device described, a vehicle cannot be driven if any of the doors are open or are improperly latched, with the result that accidents and damage occasioned by proceeding with opened doors will be eliminated. Also, the device is of simple and novel construction, and is well adapted for the purpose described.

What I claim as my invention is:

1. In an automatic locking mechanism for motor vehicles, a depressible clutch pedal, an arm pivotally mounted adjacent the clutch pedal to releasably engage the under portion of the pedal to prevent depression of the same, an electrical member controlling said arm to move and hold it in clutch engaging position, and switches controlled by doors on the vehicles and arranged in parallel and associated in the circuit of said electrical member for independently operating the same.

2. In an automatic locking mechanism for motor vehicles, a depressible clutch pedal, an electrically controlled pivotal stop member adjacent the clutch pedal, an open electrical circuit including said stop member, a signal in said circuit, and a switch controlling the circuit and operated by a door of the vehicle.

In testimony whereof, I affix my signature.

ARTHUR G. DEMAND.